Dec. 21, 1965    F. J. PILIA ET AL    3,224,283
OSCILLATOR UNIT

Filed Aug. 7, 1962    3 Sheets-Sheet 1

INVENTORS
FRANK J. PILIA &
JOHN H. BREMS
BY *Richard S. Shreve, Jr*

ATTORNEY

INVENTORS
FRANK J. PILIA &
JOHN H. BREMS
BY
*Richard S. Shreve Jr*
ATTORNEY

Dec. 21, 1965    F. J. PILIA ET AL    3,224,283
OSCILLATOR UNIT

Filed Aug. 7, 1962    3 Sheets-Sheet 3

INVENTORS
FRANK J. PILIA &
JOHN H. BREMS
BY
Richard S. Shreve Jr.
ATTORNEY

# United States Patent Office 3,224,283
Patented Dec. 21, 1965

3,224,283
OSCILLATOR UNIT
Frank J. Pilia, West Orange, N.J., and John H. Brems, Detroit, Mich., assignors to Union Carbide Corporation, a corporation of New York
Filed Aug. 7, 1962, Ser. No. 215,431
8 Claims. (Cl. 74—53)

This invention relates to oscillator units, and more particularly to driving mechanisms of this character for oscillating an implement such as a torch, preferably transverse to a line of welding.

Some torch oscillators heretofore provided have been of the pendulum type with harmonic motion, which caused a depression in the center of the weld and ridges at the outer edges. Also some torch oscillators had spring return, which permitted the inertia to carry the torch beyond the desired stroke. Furthermore, the various requirements of the work to be done resulted in many different types.

In pipe welding operations when a 360° rotation of the torch is required, many prior oscillators were too cumbersome and unwieldy for this use, or unable to operate in all angular positions.

It is therefore the main object of the present invention to provide a simple and compact oscillator unit to produce straight line motion, preferably positively controlled at uniform speed, with a dwell at each end of the oscillation.

Other objects are to provide an oscillator unit operable in any position, lightweight, lubricated and sealed, with a captive travel positive return cam preferably of the barrel type, quickly and readily replaceable with running amplitude adjustment from outside and on top of the casing.

According to the present invention, the torch oscillator unit comprises a casing having slide bearings in opposite walls thereof, a torch supporting frame outside of the casing, a thrust rod rigidly connected to said frame and slidable in the bearings. A drive shaft is journaled in the casing parallel to the thrust rod, and mechanism inside the casing is actuated by rotation of the shaft for reciprocating the thrust rod in the bearings. This mechanism imparts positive thrust and return of the thrust rod.

Preferably, a pair of the slidable thrust rods are connected by a yoke inside the casing. Preferably, the drive shaft is parallel to the thrust rods and has a barrel cam thereon, with a follower and mechanism for driving the yoke therefrom.

The cam follower is preferably on a swing arm having a slide connected to a thrust block in a channel in the yoke, for adjusting the amplitude of oscillation even while the unit is operating.

Figure 1:
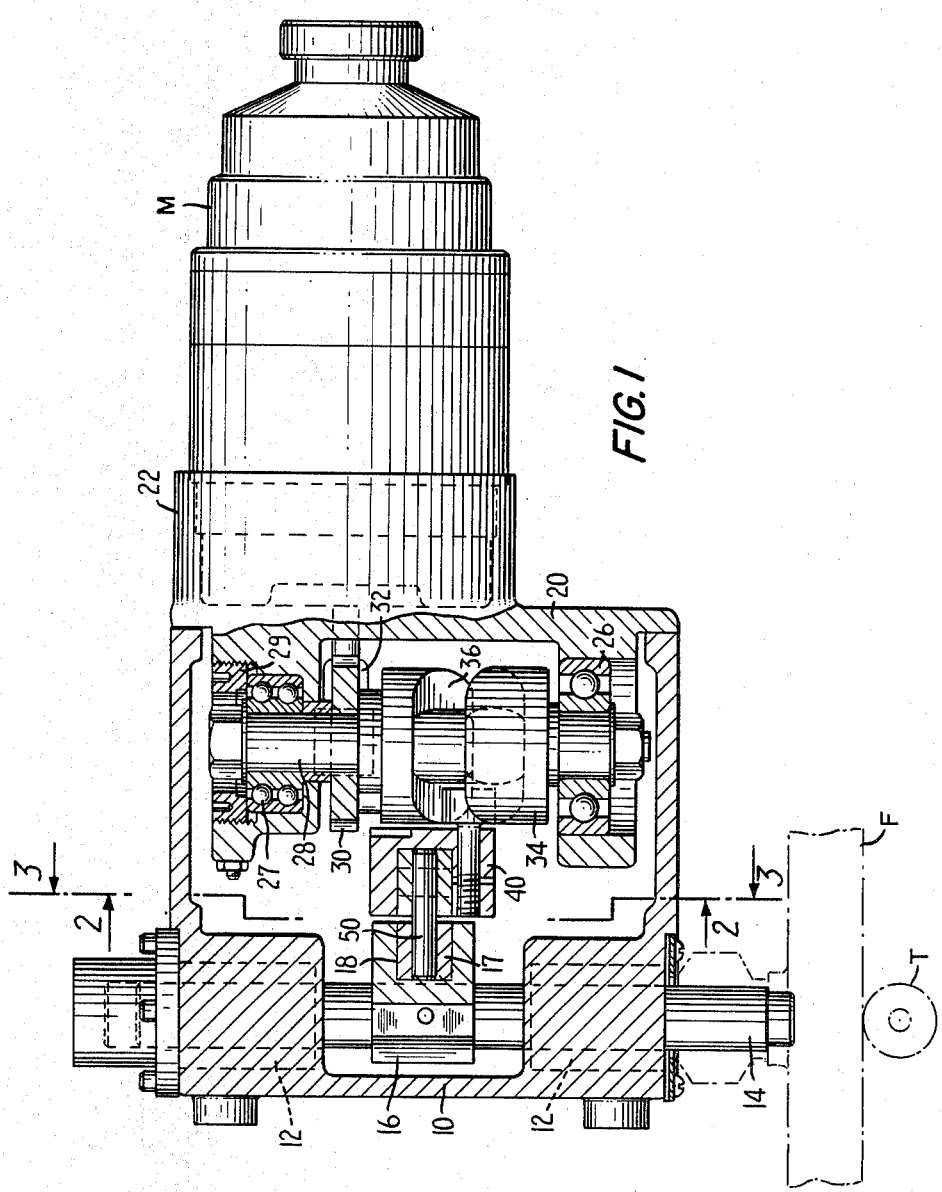
FIG. 1 is a plan, partly in horizontal section of an oscillator unit according to the preferred embodiment of the present invention.

The unit shown in the drawings comprises a box-like casing having internal bosses on opposite walls which receive slide bearings 12 for a pair of parallel thrust rods 14 slidable therein for longitudinal reciprocation. These rods extend outside the casing 10, preferably at each end, so that either end may be rigidly secured outside of the casing to a mounting frame F for an implement such as a torch T.

Figure 3:
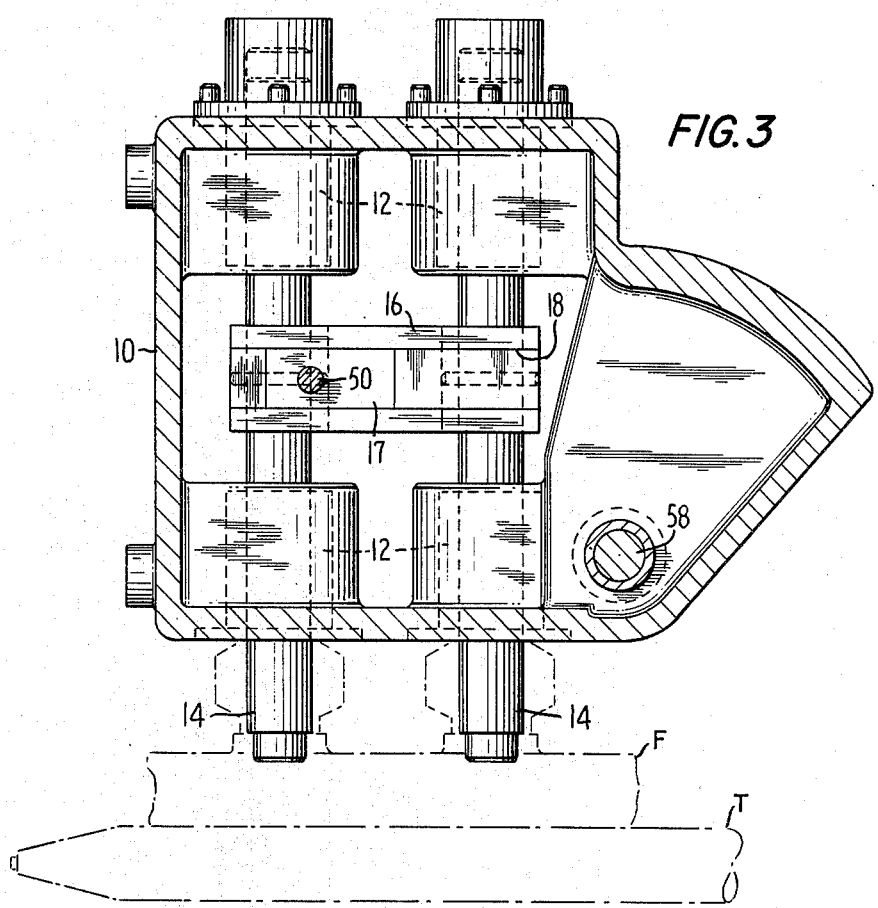
FIG. 3 is a reverse vertical section taken along the line 3—3 of FIG. 1.

As shown in FIG. 3, the thrust rods 14 are rigidly connected together inside the casing 10 by a yoke 16 extending vertically therebetween. A yoke driver thrust block 17 is slidable in the yoke, preferably in a channel 18 transverse to the rods 14.

The casing 10 has a removable cover wall 20 sealed thereto in oil tight relation. The wall 20 has an integral outer socket 22 forming part of the housing of a drive motor M mounted therein.

The cover wall 20 has internal bosses extending into the casing 10 and provided with bearings 26 and 27 in which is journaled a cam shaft 28. The outer bearing 27 is held in place by a screw plug 29, which when the cover 20 is removed, provides ready access for removal of the shaft 28.

The shaft 28 is driven by a gear 30 engaging a worm 32 on the drive shaft of motor M. Rigidly secured on the shaft 28 is a cylindrical or barrel cam 34 having a track formed by a peripheral groove 36.

Figure 5:
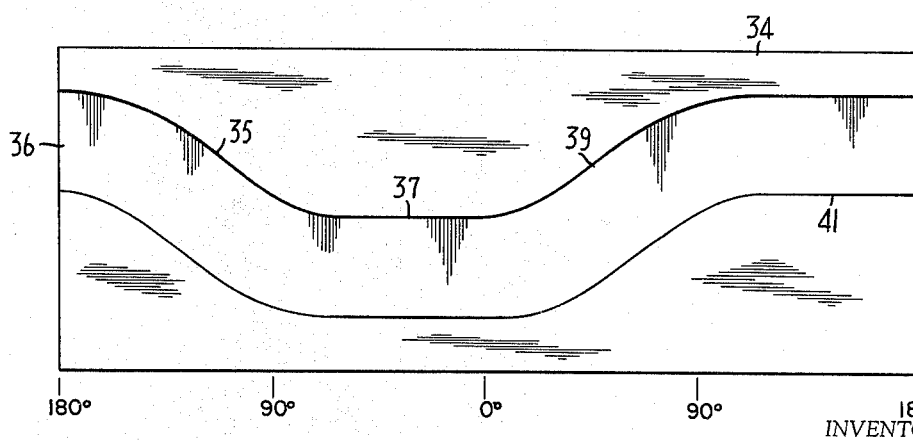
FIG. 5 is a development of the groove of the cam shown in the preceding views.

The development of groove 36 is shown in FIG. 5. The straight inclined portion 35 drives at uniform speed, the radial portion 37 holds a dwell at the end of the stroke. The reversely inclined straight portion 39 positively returns at uniform speed, and the radial portion 41 forms the return dwell.

Figure 4:
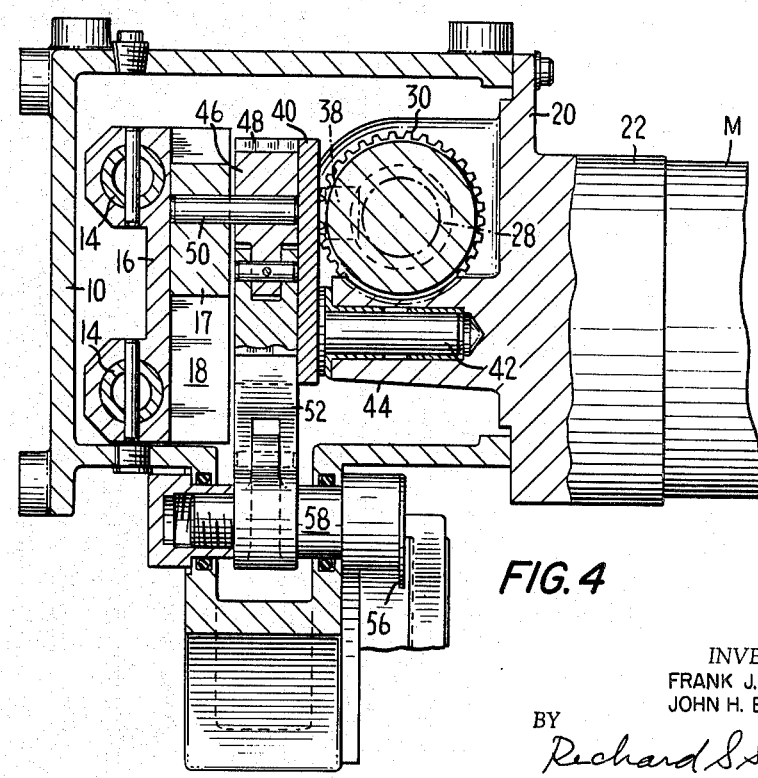
FIG. 4 is a horizontal section taken along the line 4—4 of FIG. 2.

As shown in FIG. 4, a follower 38 for the cam 34 is secured on a swing arm 40 pivoted on a fixed axis below and transverse to the cam shaft 28, preferably by an axle 42 journaled in a boss 44 extending inwardly from the cover wall. The arm 40 swings in a vertical plane substantially tangent to the periphery of the barrel cam 34.

A swing block 46 is slidable along the swing arm 40, which is preferably in the form of a channel 48 slidably receiving the block 46, which is pivotally connected by a pin 50 to the yoke drive thrust block 17 slidable in the yoke channel 18.

Figure 2:
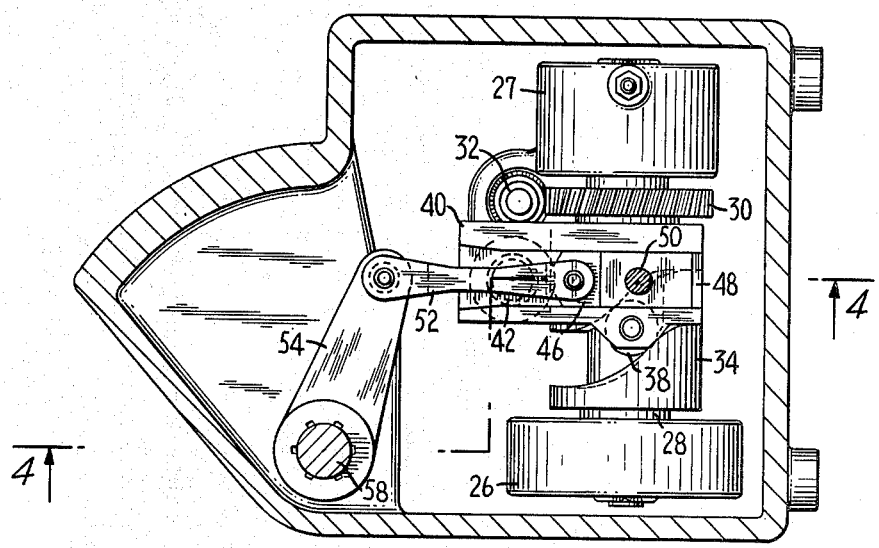
FIG. 2 is a transverse vertical section taken along the line 2—2 of FIG. 1.

As shown in FIG. 2, the swing slide block 46 is connected by a link 52 to an arm 54 of a bell crank 58, the other arm 56 of which extends outside of the casing as a hand crank for adjusting the amplitude of oscillation of the torch T.

In operation, the drive motor M drives worm 32 which through gear 30 drives cam shaft 28. The inclined straight portion 35 of the cam 34 drives follower 38 which swings arm 40 about axle 42. The swing slide block 46 in the channel 48 of arm 40, through pin 50, drives yoke drive slide thrust block 17 in channel 18 of yoke 16, which drives the thrust rods 14.

To adjust the amplitude, hand crank 56 turns bell crank 58 and arm 54, which through link 52 moves swing slide 46 nearer to or farther away from axle 42. Shortening the radius decreases the amplitude of oscillation.

What is claimed is:

1. An oscillator unit comprising a casing having slide bearings in parallel walls thereof, an implement supporting frame outside of said casing, a pair of parallel thrust rods connected to said frame and slidable in said bearings, a yoke inside said casing rigidly connecting said thrust rods and having a channel transverse thereto, a thrust block slidable in said channel along said yoke, a drive shaft journaled in said casing parallel to said thrust rods, and mechanism inside said casing engaging said thrust block and actuated by rotation of said shaft for reciprocating said thrust rod in said slide bearings, said mechanism comprising a barrel cam mounted on said drive shaft, a cam follower connected to said cam, a swing arm carrying said cam follower and pivoted to said casing, a slide block carried by said swing arm for longitudinal adjustment, said slide block being pivoted to said thrust block, a link connected to said slide block, an arm pivoted to said casing and connected to said link, and a hand lever connected to said link for adjusting the position of said slide block relative to the axis of said swing arm even while the unit is operating, providing a running adjustment of the amplitude of oscillation thereof.

2. Torch oscillator unit comprising a casing having slide bearings in opposite walls thereof, a torch supporting frame having a pair of parallel thrust rods rigidly connected together outside of said casing and slidable in said bearings for longitudinal reciprocation, a yoke inside said casing connecting said thrust rods, a drive shaft journaled in said casing parallel to said thrust rods, a cam on said drive shaft, a swing arm pivoted on an axis transverse to said cam shaft and having a longitudinal channel, a block slidable in said channel and mechanism inside said casing connecting said swing arm slide block to said yoke for imparting such reciprocation with positive thrust and return to said rods sliding in said slide bearings.

3. Torch oscillator unit comprising a casing having slide bearings in opposite walls thereof, a torch supporting frame having a pair of parallel thrust rods rigidly connected together outside of said casing and slidable in said bearings for longitudinal reciprocation, a yoke inside said casing connecting said rods, a thrust block slidable along said yoke, a motor secured to said casing, a cam shaft journaled in said casing parallel to said thrust rods and driven by said motor, a cam on said shaft and driven thereby, a follower driven by said cam, a swing arm pivoted on an axis transverse to said cam shaft, a block slidable along said swing arm and pivoted to said thrust block, said follower being journaled on said swing arm for driving said yoke for imparting such reciprocation to said torch supporting frame.

4. An oscillator unit comprising a casing having slide bearings in parallel walls thereof, an implement supporting frame outside of said casing, a plurality of thrust rods rigidly connected to said frame and slidable in said bearings, a yoke inside said casing connecting said thrust rods, a thrust block slidable along said yoke, a drive shaft journaled in said casing parallel to said thrust rods, a cam on said shaft and driven thereby, a swing arm pivoted in said casing, a follower on said swing arm engaging said cam, and a swing block slide on said arm pivoted to said thrust block for driving said thrust rod in said slide bearings.

5. An oscillator unit comprising a casing having slide bearings in parallel walls thereof, a pair of implement supporting parallel thrust rods mounted in said slide bearings for longitudinal reciprocation, a yoke inside said casing rigidly connecting said thrust rods, a thrust block mounted to slide in said yoke, a motor secured to said casing, a shaft journaled in said casing, gear means connecting said shaft to said motor, a cam on said shaft, a swing arm pivoted on an axis transverse to said cam shaft and having a longitudinal channel, a swing block mounted to slide in said channel and pivoted to said thrust block, and a cam follower on said swing arm engaged by said cam, whereby said implement supporting thrust rods are reciprocated when said motor is energized through the operation of said shaft, cam, cam follower, swing arm, swing block, thrust block and yoke, and said slide block provides means for adjusting the amplitude of oscillation of the implement during operation thereof.

6. An oscillator unit comprising a casing having slide bearings in parallel walls thereof, a pair of implement supporting parallel thrust rods slidable in said bearings, a yoke inside said casing rigidly connecting said thrust rods, a thrust block slidable in said yoke, a cover plate secured to said casing having rotary bearings extending into said casing, a drive shaft journaled in said bearings, a swing arm pivoted on an axis transverse to said cam shaft, a drive block slidable in said swing arm and pivoted to said thrust block, a cam on said shaft and driven thereby, and a cam follower engaging said cam and connected to said drive block, whereby operation of said drive shaft, rotates said cam which reciprocates said cam follower, drive block, swing arm, thrust block, yoke and implement supporting rods.

7. An oscillator unit comprising a casing having slide bearings in parallel walls thereof, a pair of implement supporting thrust rods slidable in said bearings, a yoke inside said casing rigidly connecting said thrust rods, a drive slide block on said yoke, a drive shaft journaled in said casing, a cam on said shaft and driven thereby, an arm pivoted in said casing on a fixed axis spaced from said cam shaft to swing in a plane adjacent said cam, a cam follower on said swing arm connected at a fixed radius from said axis and associated with said cam, a swing slide block on said arm connected to said drive slide block on said yoke, and means for manually adjusting the position of said swing slide block on said arm to change the amplitude of oscillation of said thrust rods even during operation thereof.

8. An oscillator unit comprising a casing having slide bearings in parallel walls thereof, a pair of implement supporting parallel thrust rods slidable in said bearings for longitudinal reciprocation, a drive yoke rigidly connecting said rods inside said casing, a thrust block slidably mounted in said yoke, a cam shaft journaled in said casing, a drive motor secured to the outside of said casing wall, gear means connecting said shaft to said motor, a cam rigidly secured on said cam shaft, a swing arm pivoted in said casing, a cam follower on said swing arm and connected to said cam, a swing slide block on said arm pivotally connected to said thrust block in said yoke, a link pivoted to said slide block, and means manually operable from outside of said casing for moving said link to adjust said blocks to set the amplitude of oscillation of the implement even during the operation thereof.

References Cited by the Examiner

UNITED STATES PATENTS

| | | | |
|---|---|---|---|
| 1,025,976 | 5/1912 | Gulliford | 74—56 |
| 2,463,604 | 3/1949 | Denyssen | 74—50 |
| 2,472,803 | 6/1949 | Beyer et al. | 113—132 |
| 2,617,307 | 11/1952 | Drissner | 74—53 |
| 2,622,445 | 12/1952 | Benedict | 74—50 |
| 2,679,165 | 5/1954 | Montgomery | 74—57 |
| 2,726,617 | 12/1955 | Knapp | 113—134 |
| 2,726,620 | 12/1955 | Meissner | 113—59 |
| 3,066,394 | 12/1962 | Litzka | 29—200 |

MILTON KAUFMAN, *Primary Examiner.*

BROUGHTON G. DURHAM, *Examiner.*